(12) United States Patent
Hirama et al.

(10) Patent No.: US 6,970,184 B2
(45) Date of Patent: Nov. 29, 2005

(54) IMAGE DISPLAY METHOD AND APPARATUS FOR REARVIEW SYSTEM

(75) Inventors: Yuichi Hirama, Yokohama (JP);
Satoru Masuda, Yokohama (JP);
Hidetoshi Mimura, Yokohama (JP);
Kazuki Miyama, Yokohama (JP);
Masahiro Takata, Zama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 552 days.

(21) Appl. No.: 10/109,375

(22) Filed: Mar. 28, 2002

(65) Prior Publication Data

US 2002/0149673 A1 Oct. 17, 2002

(30) Foreign Application Priority Data

Mar. 29, 2001 (JP) .................................... P. 2001-096360
Mar. 19, 2002 (JP) .................................... P. 2002-076467

(51) Int. Cl.⁷ ................................................. H04N 7/00
(52) U.S. Cl. ..................................................... 348/148
(58) Field of Search ................................. 348/148–151, 348/11–120, 735, 207.99, 233.01, 239; 340/431, 687, 438, 686, 932.2; 304/305; 280/477; 414/333; 701/41; H04N 7/00

(56) References Cited

U.S. PATENT DOCUMENTS

| | | | | |
|---|---|---|---|---|
| 5,414,461 A | * | 5/1995 | Kishi et al. .................. | 348/115 |
| 5,452,982 A | * | 9/1995 | Engle ........................... | 414/333 |
| 6,222,457 B1 | * | 4/2001 | Mills et al. .............. | 340/686.1 |
| 6,480,104 B1 | * | 11/2002 | Wall et al. .................. | 340/431 |
| 6,611,744 B1 | * | 8/2003 | Shimazaki et al. ........... | 701/41 |
| 6,621,421 B2 | * | 9/2003 | Kuriya et al. ............ | 340/932.2 |

FOREIGN PATENT DOCUMENTS

| | | |
|---|---|---|
| EP | 1 022 903 A2 | 7/2000 |
| JP | 10-211849 | 9/1998 |
| JP | 2000-172996 | 6/2000 |
| JP | 2000-272445 | 10/2000 |
| JP | 2001055100 | 2/2001 |

* cited by examiner

*Primary Examiner*—Tung Vo
(74) *Attorney, Agent, or Firm*—Pearne & Gordon LLP

(57) ABSTRACT

An image display method for a rearview camera for displaying an image shot by a rearview camera mounted on a vehicle on a screen that can be viewed from a driver's seat, the method includes the step of displaying an auxiliary line image indicating the straight rear direction of the vehicle superimposed on the image shot by the vehicle on the screen. When the vehicle has approached the trailer within a predetermined range, an image from the rearview camera is converted to an image from a virtual overhead viewpoint then displayed on the screen. The driver easily back the vehicle to bring the hitch in the blind spot at the rear of the vehicle to coincide with a coupling member on the trailer while watching the screen display.

28 Claims, 10 Drawing Sheets

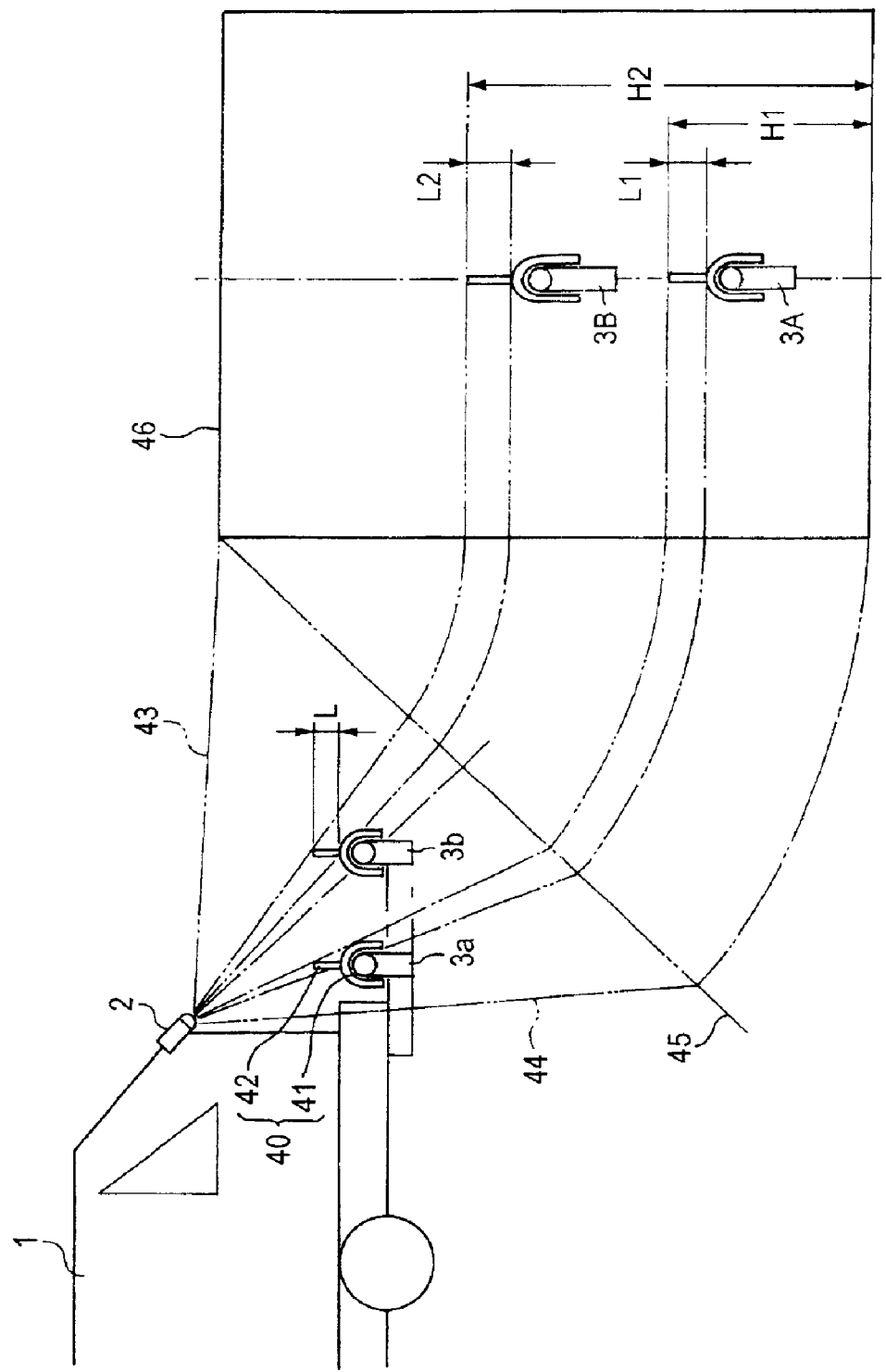

IMAGE DISPLAY METHOD AND APPARATUS FOR REARVIEW SYSTEM

BACKGROUND OF THE INVENTION

The present invention relates to an image display method and apparatus for a rearview camera mounted on a vehicle, and in particular to an image display method and apparatus for a rearview camera mounted on a vehicle for assistance of a driver when a vehicle is backed and a coupling member attached at the rear of the vehicle (hereinafter referred to as a "hitch") is coupled to a trailer.

A vehicle, that mounts apparatus where a rearview camera is attached to the rear of the vehicle and an image from the rearview camera is displayed on a car navigation screen at the driver's seat for the purpose of safety check, has recently been in wide use. A wide angle camera is used as a rearview camera in order to avoid collision with an rearward obstacle when a vehicle is backed for parking. A wide range is accommodated in a single screen.

Some vehicles have a hitch at the rear of the vehicle in order to couple a trailer or a camper to the back, when a trailer is coupled to the hitch, the vehicle is backed so that the hitch on the vehicle may engage a coupling member of the trailer. It is quite difficult for a driver to accurately back the vehicle so that the hitch mounted in a blind spot from the driver may engage the coupling member on the trailer.

In case an assistant is available, he/she can instruct the backing sequence to the driver. When the driver is alone, it is difficult to couple a hitch with a trailer. However, a vehicle mounting a rearview camera facilitates the coupling work. As mentioned earlier, a wide angle camera is used as a rearview camera, and the wide angle camera provides a more distorted image as compared with the actual image. Thus, it requires a considerable skill for a driver alone to accurately back the vehicle and perform coupling work while watching the image from the rearview camera.

SUMMARY OF THE INVENTION

The object of the invention is to provide an image display method and apparatus for a rearview camera wherein a driver alone can easily back a vehicle to connect a trailer with the vehicle.

The aforementioned object is attained by providing an image display method for a rearview camera for displaying an image shot by a rearview camera mounted on a vehicle on a screen that can be viewed from a driver's seat, wherein the method superimposes an auxiliary line image indicating the straight rear direction of the vehicle on the image shot by the vehicle on the screen. With this configuration, the driver can easily back the vehicle straight backward while watching the screen display.

Preferably, the auxiliary line image extends from the position of the hitch attached at the rear of the vehicle and the auxiliary line image has a distance marker. With this configuration, the driver can recognize the distance to the hitch thus allowing more precise operation.

Preferably, the portion where the auxiliary line image overlaps a rearward obstacle is hidden and the auxiliary line image is discriminated from other images, such as blinking. With this configuration, it is possible to prevent an auxiliary line from overlapping the rearward obstacle thus worsening the image quality.

Preferably, the invention converts an image shot by the rearview camera to an image from an overhead viewpoint and displays the resulting image in the screen when the distance between the vehicle and the rearward obstacle has become within a predetermined range, and superimposes the auxiliary line image on the image from an overhead viewpoint while allowing the image from an overhead viewpoint to be zoomed. With this configuration, it is possible to precisely grasp the relation with the hitch when the hitch is approached.

Preferably, in case the image of the hitch and an image of the coupling counterpart have approached each other within a predetermined distance, the invention causes the display of the auxiliary line image to blink at predetermined intervals. With this configuration, it is possible to recognize that the vehicle is backing straight to the hitch.

Preferably, the invention displays using illustration data a horizontal line image crossing the auxiliary line image at a right angle and passing through the center of the hitch. With this configuration, it is possible to easily check the hitch position even in case the hitch image is hidden under the image of the coupling counterpart, thus accurately engaging the hitch with the coupling counterpart.

Preferably, the invention superimpose a horizontal line image crossing the auxiliary line image at a right angle and passing through the center of the hitch on the image from the overhead viewpoint. With this configuration, it is possible to easily check the hitch position even in case the hitch image is hidden under the image of the coupling counterpart, thus accurately engaging the hitch with the coupling counterpart.

Preferably, the invention is capable of adjusting the vertical position of the horizontal line image in the screen. With this configuration, it is possible to change the display position of the horizontal line image so that the driver can comfortably drive the vehicle, thus facilitating driving while watching the horizontal line image.

Preferably, the invention displays using illustration data a horizontal line image of the coupling counterpart crossing the auxiliary line image at a right angle and passing through the predetermined section of the coupling counterpart of the hitch, so that the horizontal line image of the coupling counterpart and the auxiliary line image can be discriminated from each other. With this configuration, it is possible to drive a vehicle accurately so that the hitch and the coupling counterpart will engage each other even when the hitch and the coupling counterpart have approached quite close to each other.

Preferably, the invention attaches to the hitch reference check means having a reference axis of a predetermined length and attachable to the hitch and comprises calculating means for calculating the position of the hitch based on the difference between the length of the reference axis in an image shot by the shooting means and the predetermined length of the reference check means. With this configuration, it is possible to automatically obtain the display position of a horizontal line image assumed when the hitch is replaced with another, thus eliminating the cumbersome work on the part of the driver.

Preferably, the invention comprises adjusting means for adjusting the position of the horizontal line image based on the calculation result assumed when the invention displays using illustration data a horizontal line image crossing the auxiliary line image at a right angle and passing through the center of the hitch. With this configuration, the horizontal line image is displayed while automatically adjusted in accordance with the replacement of hitches even when hitches are frequently replaced.

In this way, according to the invention, it is possible to check which direction will be the straight rear direction of a vehicle referring to an auxiliary line image on the screen so that the driver alone can back the vehicle to a target position referring to the relation between the target and the auxiliary lines. By extending the auxiliary line image from the hitch location typically provided at the center of the rear of the vehicle in the width direction, it is possible to back the vehicle accurately so that the hitch in the blind spot at the rear of the vehicle will engage a coupling member on a trailer.

BRIEF DESCRIPTION OF THE DRAWINGS

FIG. 16 explains how to calculate the illustration data display position of a horizontal line image by using screen display apparatus according to an embodiment of the invention.

DETAILED DESCRIPTION OF THE PREFERRED EMBODIMENT

One embodiment of the invention will be described referring to drawings.

Figure 1:
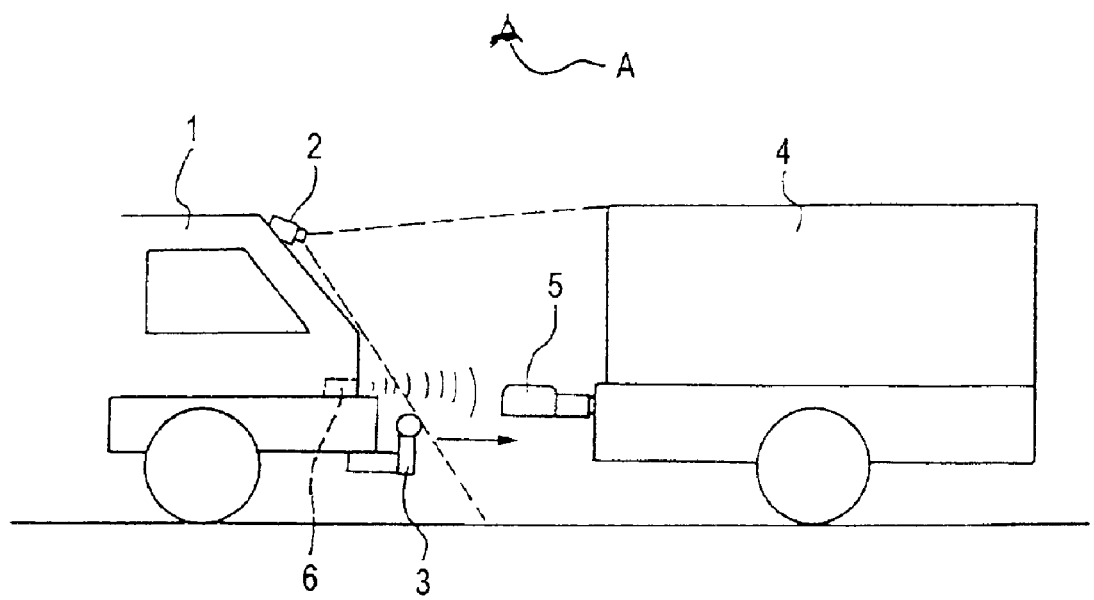
FIG. 1 shows a relation between a vehicle mounting image display apparatus for a rearview camera and a trailer according to an embodiment of the invention.

FIG. 1 shows a relation between a vehicle mounting a rearview camera and a hitch and a trailer. A rearview camera 2 is mounted at the rear of the vehicle 1. One rearview camera may be provided at the rear of the vehicle or two rearview cameras may be provided and images shot by two cameras maybe synthesized to form an image displayed on the screen at the driver's seat. A hitch 3 is fixed at the center of the rear of the vehicle. The vehicle is backed and the hitch 3 engages a coupling member 5 on a trailer 4. An ultrasonic range sensor 6 is attached at the rear of the vehicle so allow measurement of the distance to a rearward obstacle.

The example in FIG. 1 shows a case where the mounting position of the rearview camera 2 is restricted so that it is impossible to capture an image of the hitch 3 in the shooting angle of the rearview camera 2. In this case, as an image of the hitch 3 displayed on the screen, illustration data is used, as mentioned later. In case it is possible to mount the rearview camera 2 at a mounting position to capture the hutch 3 in the shooting angle, a shot image can be preferably used as an image of the hitch 3 displayed on the screen. In this case, preferably, a rear bumper is in the shooting angle in order to obtain an image of the rear end of the car.

Figure 3:
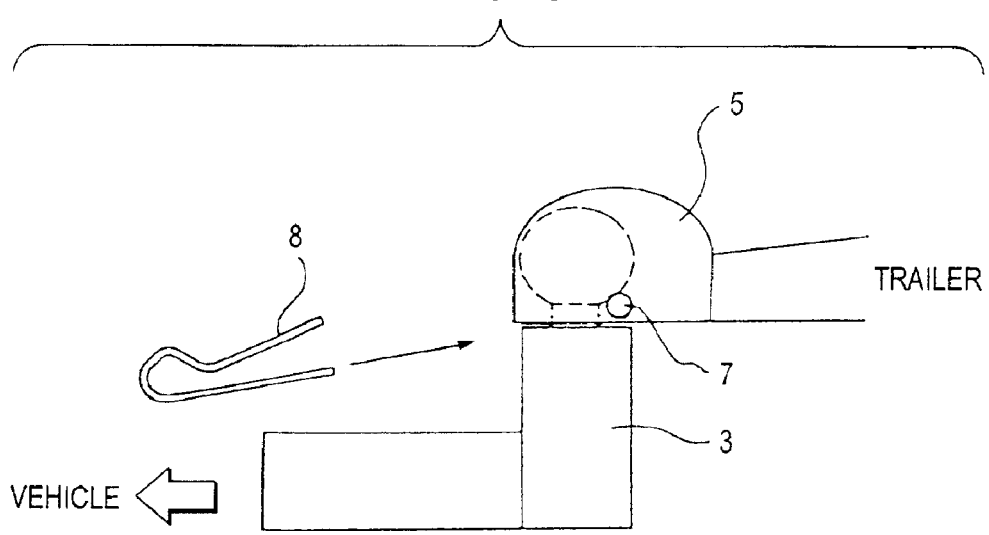
FIG. 3 shows the coupling state of a hitch and A coupling member on the trailer shown in FIG. 1.

FIG. 3 shows the coupling state of the hitch 3 and the coupling member 5. In this embodiment, the head of the hitch 3 (hereinafter referred to also as a hitch ball) is inserted into the bowl-shaped coupling member 5 and a pin 8 is inserted into a hole 7 on the coupling member 5 to avoid disengagement.

In case coupling work is done in the state FIG. 3, it is necessary to back the vehicle so that the coupling member 5 coincides with the head of the hitch 3. Thus, the rear of the vehicle 1 is shot by the rearview camera 2 and the shot image is displayed on an LCD screen for a car navigation system. The rearview camera is a wide angle camera so that its shot image is more distorted than actual as shown in FIG. 4.

Figure 2:
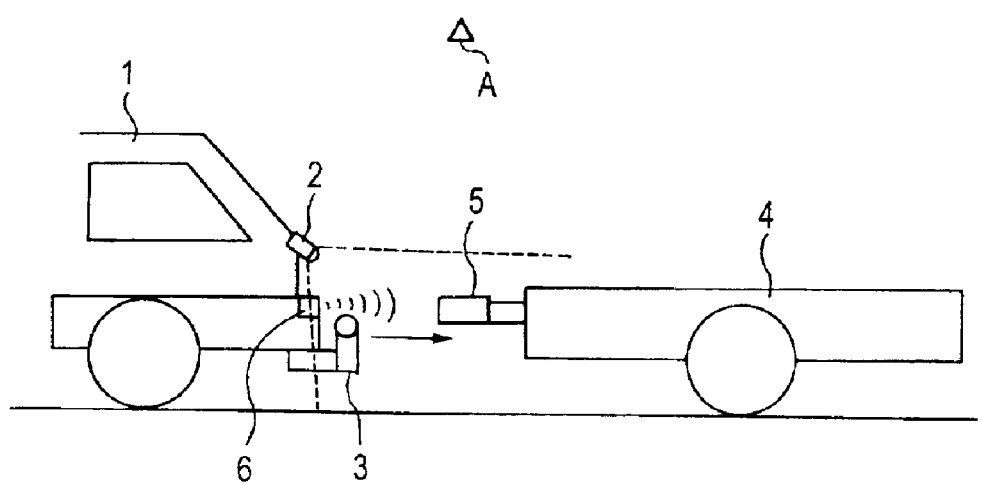
FIG. 2 shows a relation between a vehicle and a trailer indicating the case where the mounting position of a rearview camera shown in FIG. 1 is changed.
Figure 4:
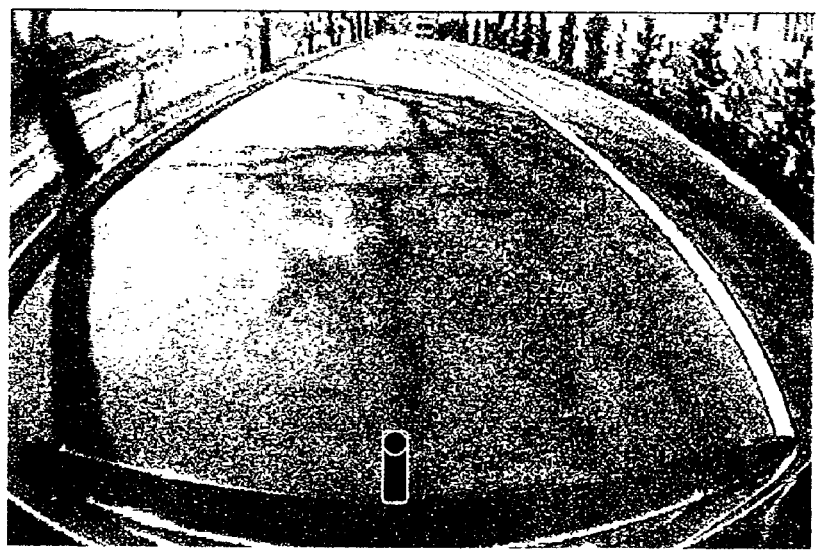
FIG. 4 shows a shot image example of a rearview camera shown in FIG. 1.

While the hitch image displayed in the screen shown in FIG. 4 is illustration data, the image of the hitch 3 is an actual shot image in case two rearview cameras are provided at the mounting position shown in FIG. 2. While this embodiment will be described using a screen example via illustration data, this invention is applicable to a case where an actual shot image is used as an image of the hitch 3.

Figure 5:
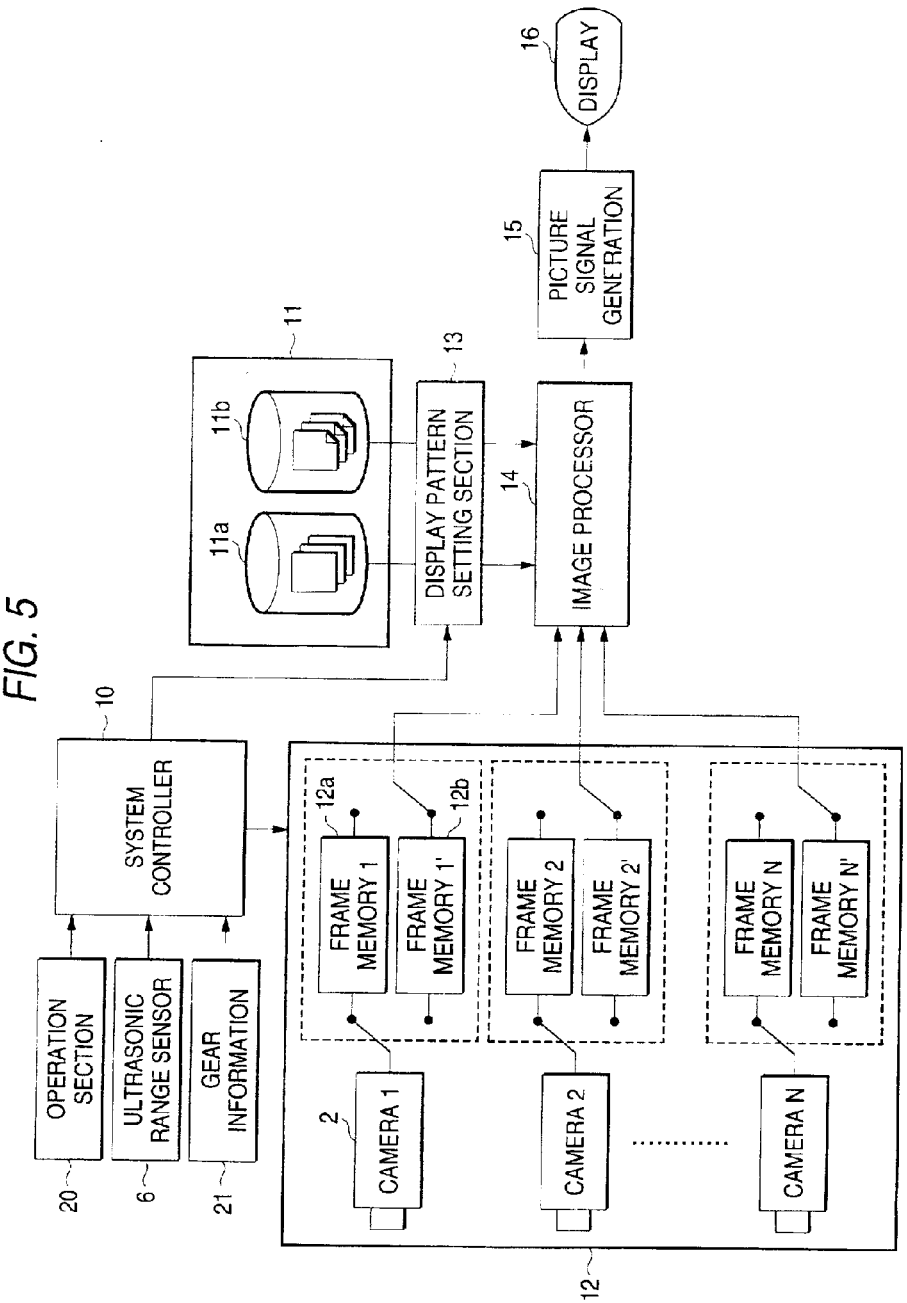
FIG. 5 is a block diagram showing image display apparatus for a rearview camera.

FIG. 5 is a block diagram of image display apparatus for a rearview camera according to one embodiment of the invention. This display apparatus includes a system controller 10, a display pattern storage 11, an imaging section 12, a display pattern setting section 13, an image processor 14, a picture signal generator 15, and a display 16 (also serving as an LCD screen for car navigation system). To the system controller 10, input signals from an operation section 20, for example a signal for switching the viewpoint conversion mode operated by the driver, a signal for instructing the display position fine adjustment of a horizontal line image for hitch coupling described later, and a measurement signal from the ultrasonic range sensor 6 as well as gear information 21 acquired from a gear box (not shown) are input.

In the illustrated example, the imaging section 12 is provided with N (for example 8) view cameras. This is because two cameras are also respectively mounted on the front of the vehicle 1 (FIG. 1), left side of the vehicle 1, and right side of the vehicle 1. The rearview camera 2 is one or two cameras out of these. Two frame memories 12a, 12b are installed for respective cameras. This is to write image data captured from a camera into frame memory then read the image data written into frame memory by the image processor 14 to display on the screen and repeat theses processes alternatively so that a more real-time image display is made possible.

The display pattern storage 11 includes an illustration data storage 11a and a mapping table 11b. The illustration data storage 11a stores image data for displaying an image of illustration data replaced with displaying the image data from a view camera or displaying an illustrated version of an image out of the shooting range of the view cameras. The illustration data storage 11 stores auxiliary line data according to this embodiment and distance marker data that are read into the display pattern setting section 13 in accordance with an instruction from the system controller 10 and superimposed on a camera-shot image.

The mapping table 11b is a table for performing coordinate conversion of an image shot by a view camera. The view camera 2 shown in FIG. 1 or FIG. 2 shoots an image between members vertically apart with respect to the ground as an image father than the actual, in order to shoot the rear image of the vehicle from upper slantwise position. In this case, converting an image shot by the camera 2 to an image as a top view from a virtual viewpoint A shown in FIG. 1 or 2 provides the driver with a clearer image.

In particular, as in this embodiment, an image from the overhead viewpoint A to allow overlapping of the hitch 3 and the coupling member 5 to be recognized by the driver is preferable. In order to do without cumbersome calculation of this coordinate conversion image using a coordinate conversion expression each time as required, a mapping table 11a for coordinate conversion is provided in advance and camera-shot image data is mapped again in accordance with the mapping table 11b to obtain at a high speed an image from the virtual viewpoint A.

The display pattern setting section 13 reads required illustration data, auxiliary line data or required mapping table from the display pattern storage 11 in accordance with an instruction from the system controller 10, and sends the data to the image processor 14. The image processor 14 reads image data from the corresponding frame memory of the imaging section 12 and superimposes the illustration data or auxiliary line data sent from the display pattern setting section 13 on this data. The image processor re-maps the image data read from the frame memory as required in accordance with the mapping table. A picture signal generator 15 converts the image data passed from the image processor 14 to a picture signal and displays the resulting image on the LCD display 16 for car navigation system.

Figure 6:
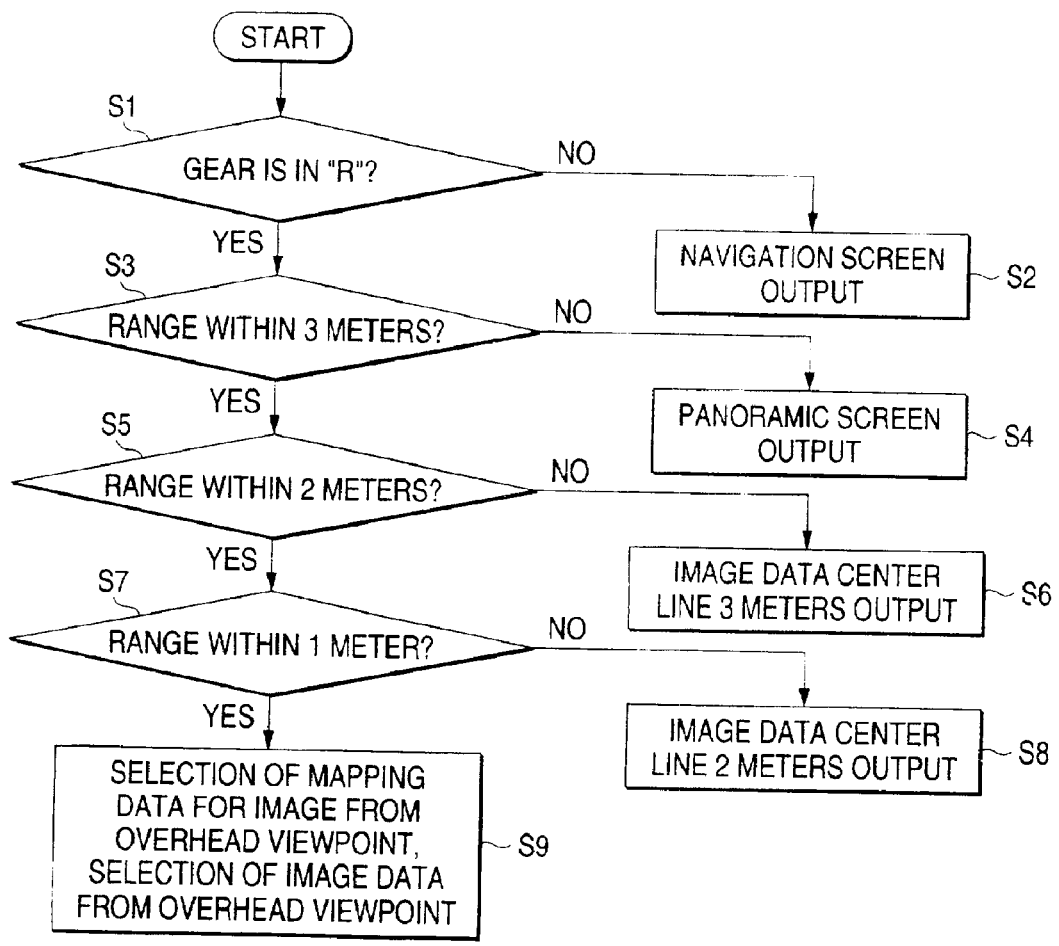
FIG. 6 is a flowchart showing the procedure of a system controller shown in FIG. 5.

FIG. 6 is a flowchart showing the procedure of the system processor 10 shown in FIG. 5. The system processor 10, once control starts, determines whether the gear is in rear R based on the gear information 21 acquired from the gear box. In case the gear is not in rear R, the vehicle is halted or advancing. Execution proceeds to step 2 and displays a navigation screen on the LCD (display system of the navigation screen is omitted in FIG. 4).

In case the gear is in rear R as a result of determination in step S1, execution proceeds to step S3. The distance to the rearward obstacle is obtained from the measurement data of the range sensor 6. It is determined whether the distance is within 3 meters. In case the distance exceeds 3 meters, execution proceeds to step S4, where an auxiliary line image is superimposed on an image on the rear view camera 2 (panoramic image: image shot at a wide angle) on the LCD screen at the driver's seat.

Figure 7:
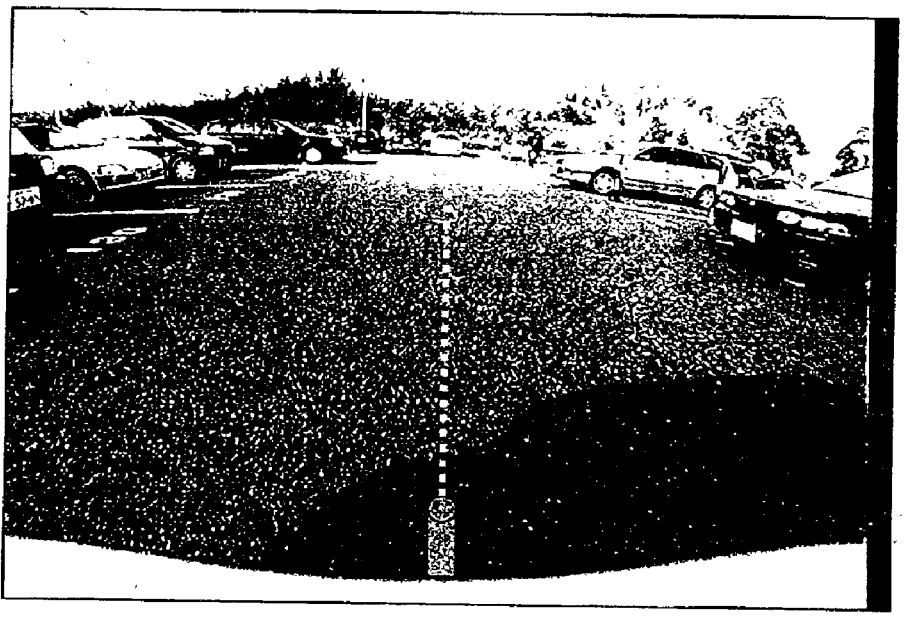

FIG. 7 shows an example of image displayed in step S4. In this embodiment, an auxiliary line image (center line of the position the hitch 3 is present) extending straight from the image of hitch 3 toward the rear of the vehicle is superimposed. The driver easily determines which direction will be the straight rear direction of the vehicle on the panoramic image by viewing this auxiliary line on the screen.

Figure 8:
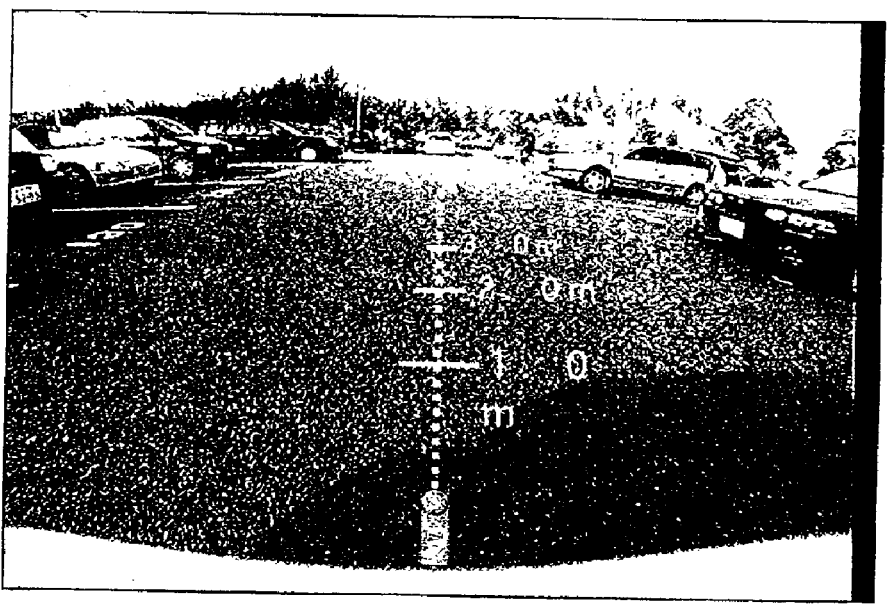
FIG. 8 shows an example of a screen where only an auxiliary line image is superimposed on a shot image from a camera.

The auxiliary line image may be hard to see so that only the embodiment is distinguished from the remaining image, for example, it may be displayed in red or blinked. Further, the distance marker may be superimposed on the screen display in step S2, as shown in FIG. 8.

In case the distance to the rearward obstacle is within 3 meters as a result of determination in step S3, execution proceeds to step S5, where it is determined whether the distance to the rearward obstacle is within 2 meters. In case the distance exceeds 2 meters, execution proceeds to step S6, where an auxiliary line image and the distance marker up to 3 meters are superimposed on a camera-shot image on the LCD screen. By doing this, the portion where the auxiliary line image overlaps the trailer is hidden thus providing an easy-to-watch screen.

In case the distance to the trailer is within 2 meters as a result of determination in step S5, execution proceeds to step S7. It is determined whether the distance to the trailer is within 1 meter. In case the distance exceeds 1 meter, execution proceeds to step S8, where an auxiliary line image and the distance marker up to 2 meters are superimposed on a camera-shot image on the LCD screen.

In case the distance to the trailer is within 1 meter as a result of determination in step S7, execution proceeds to step S9. As mentioned earlier, in case the hitch 3 or has approached the coupling member 5 of the trailer, an image from the virtual viewpoint A on the LCD screen is easier to watch for the driver. In this embodiment, a corresponding mapping table is read from the mapping table 11b and converted to an image from the virtual viewpoint A then displayed on the LCD screen.

Figure 9:
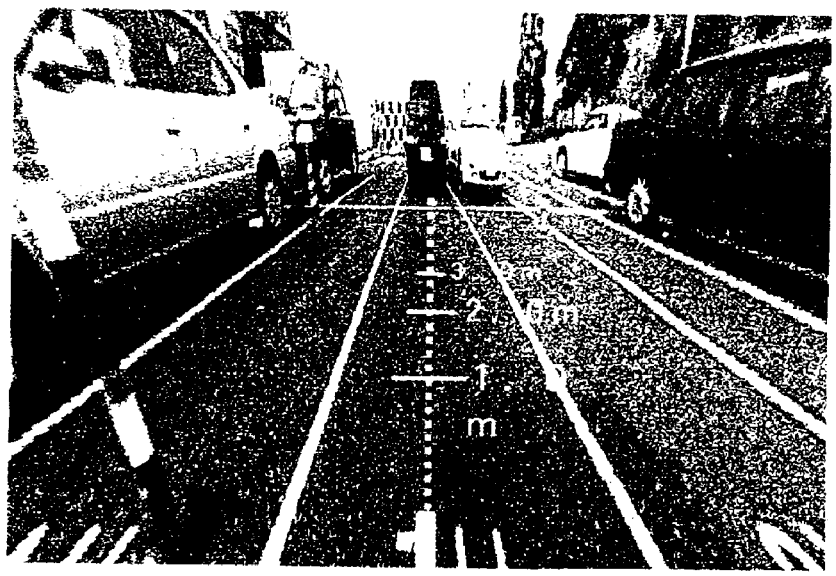
FIG. 9 shows an example of a screen where an auxiliary line image with distance mark is superimposed on a shot image from a camera.
Figure 10:
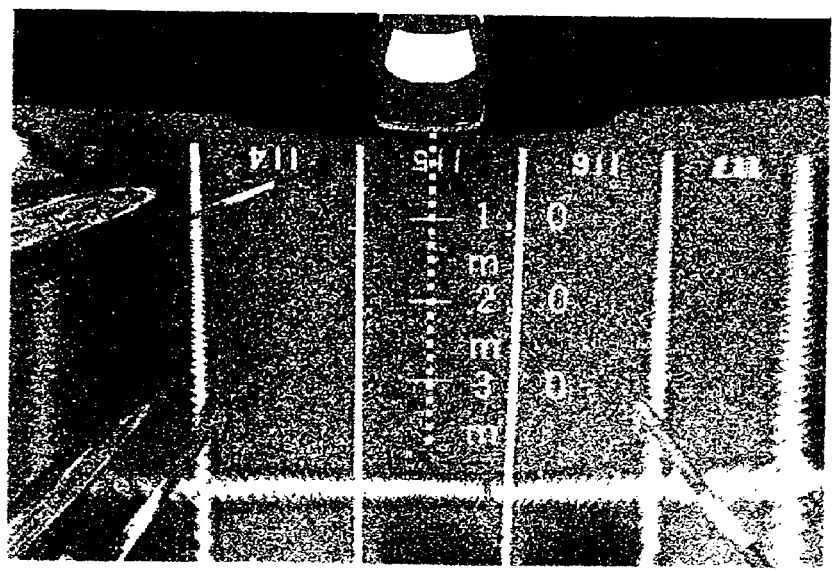
FIG. 10 shows an example of screen where an image in FIG. 9 is converted to an image from a virtual overhead viewpoint.

FIG. 9 is an image shot by a rearview camera when the vehicle is backed to the parking position. FIG. 10, 11 are examples where such image is converted to an image seen from the virtual overhead viewpoint. As shown in FIG. 9, an auxiliary line image with a distance marker is superimposed on an image shot by a camera when the image is displayed. This image is converted to an image from the virtual viewpoint A (FIG. 10).

Figure 11:
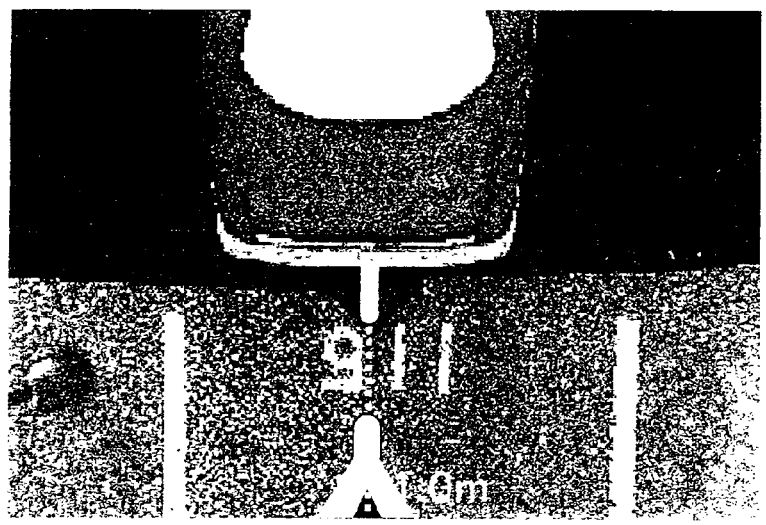
FIG. 11 shows an example of zooming of FIG. 10.

When the distance to the rearward obstacle is 1 meter, an image from the virtual overhead viewpoint is automatically zoomed (image obtained by converting a camera-shot image using a mapping table with virtual viewpoint lowered), as shown in FIG. 11. In this way, in this embodiment, when the distance is short, an image shot by the rearview camera 2 is converted to an image from the virtual overhead viewpoint A to display it on the LCD. This helps accurately check the dislocation of the hitch and the coupling member 5 of the trailer, thus facilitating coupling by the driver alone.

In case a hitch image and an auxiliary line image overlap each other and one is hidden under the other, the hitch position may be difficult to see. In this case, it is preferable that the auxiliary line image is blinked automatically at predetermined intervals such as 1 second so that the hitch position is easier to find when auxiliary lines are hidden. Zooming may be automated, or zooming maybe made by the driver's operation.

Figure 12A:
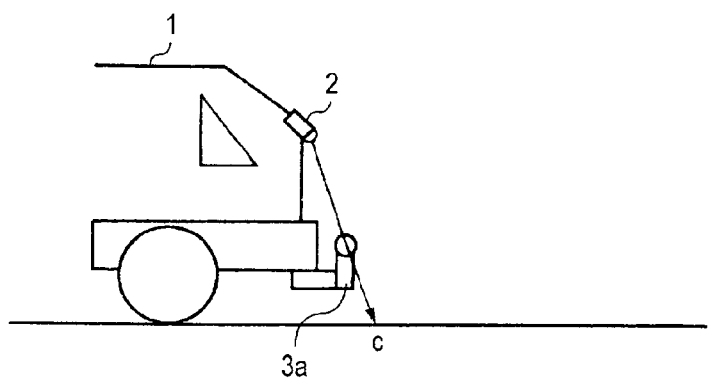
FIGS. 12A and 12B explain the difference between the difference of a ground projection point from a rearview camera concerning hitches of different distances from the rear of the vehicle.
Figure 12B:
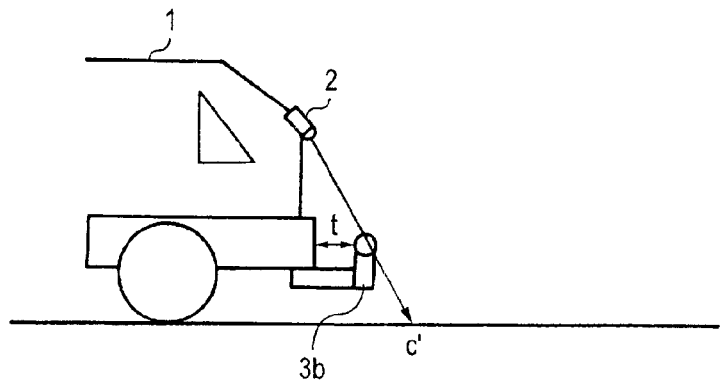

Next embodiment is preferable for replacing hitches. The hitch 3 attached to a vehicle needs to be replaced when a trailer is changed. When the hitch 3a shown in FIG. 12A is replaced with with hitch 3b having a longer distance t from the rear of the vehicle as shown in FIG. 12B, the position of a hitch ball in the head of the hitch 3b is different from that in FIG. 12A. Therefore, the empirical recognition position of the hitch of the driver accustomed to driving using the hitch 3a is dislocated.

For example, the hitch ball position in the shot image in FIG. 12A is the point c projected on the ground from the camera 2. Actual hitch ball position is before the point c. The driver empirically knows the degree of dislocation and is able to back the vehicle so that the hitch will engage the coupling member of the counterpart.

In case a real image of the hitch is displayed in a shot image, the driver can recognize the actual hitch position referring to the image. When the hitch image is hidden by a image of the coupling member 5 of the counterpart, the hitch ball position has been conventionally predicted empirically. When hitches are replaced and the distance from the rear of the vehicle to the hitch 3b is made different as shown in FIG. 12B, this knowledge is no more useful.

Figure 13A:
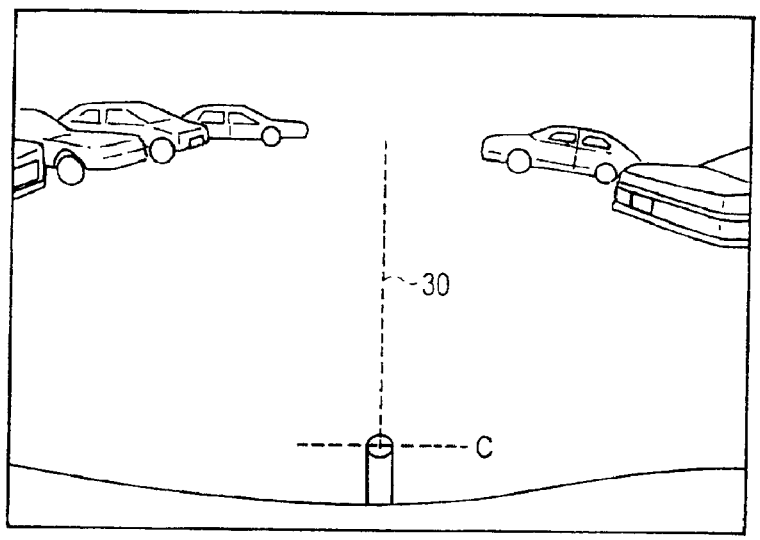
FIGS. 13A and 13B show an example of a shot image from a vehicle assumed when a hitch of a different distance from the rear of the vehicle is attached.
Figure 13B:
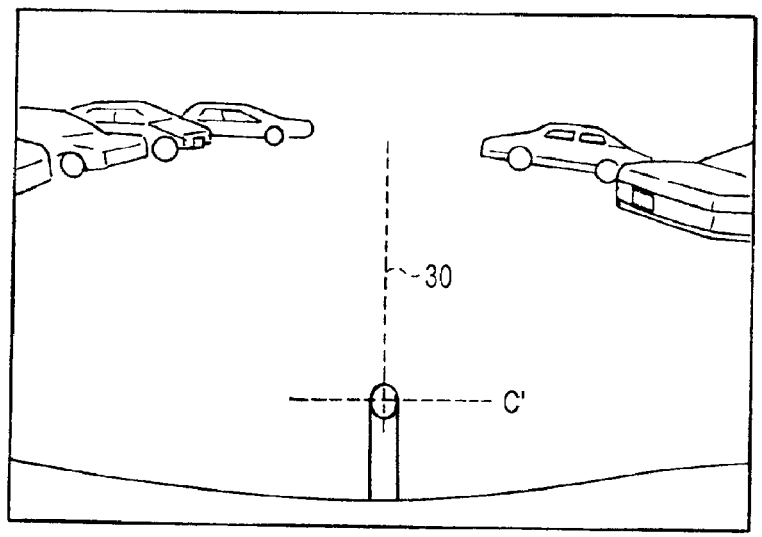

In this embodiment, as shown in FIGS. 13A and B, horizontal line image C, C' crossing an auxiliary line image 30 at a right angle and passing through the center of the hitch is displayed using illustration data. In FIG. 13A, the horizontal line image is displayed at the position of the ground projection point C of the hitch ball in FIG. 12A. In FIG. 13B, the horizontal line image is displayed at the position of the ground projection point c' of the hitch ball in FIG. 12B.

In this way, through display of the horizontal line image C, C' in FIGS. 13A and B, even in case the hitch image is hidden under the image of the counterpart coupling member 5, the driver can accurately back the vehicle using this horizontal line images C, C' as a guide in order to engage the hitch with the coupling member accurately.

Figure 14A:
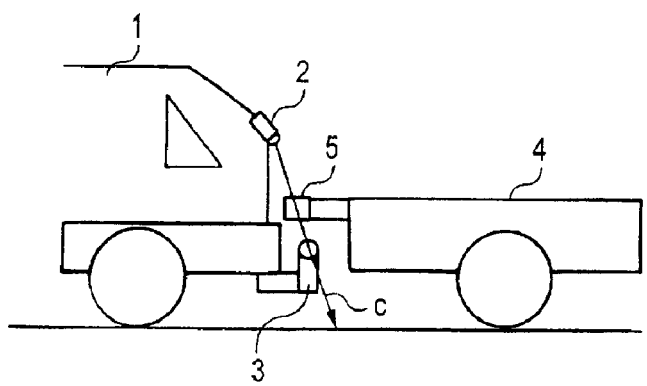
FIGS. 14A and 14B explain the ground projection points assumed when a hitch coincided with a counterpart coupling member as seen from a rearview camera.

In FIGS. 14A and B, a horizontal line image C, C' is displayed at the position of the center of the hitch ball. As understood from FIGS. 12A and B, actual hitch ball position is dislocated from the image position of the hitch ball (projection point c,c'). A beginner may fail to intuitively grasp the dislocation so that the driver should operate on the operation section 20 shown in FIG. 5 to make adjustable the illustration data display position in the horizontal line image in advance to make the horizontal line image position of the screen coincide with the actual hitch ball position. In this case, the hitch ball position and the horizontal line image position are dislocated from each other on the screen. This allows a beginner to accurately make the hitch to coincide with the counterpart coupling member.

Examples in FIGS. 12 and 13 are examples where a vehicle is backed using wide angle camera images without conversion, that is until the vehicle approaches the counterpart coupling member as close as 1 meter in the aforementioned embodiment. When the vehicle is 1 meter away from its counterpart, the images are replaced with images from above as shown in FIGS. 10 and 11. On this image from the overhead viewpoint also, a horizontal line image is super imposed on the hitch ball position to provide assistance to the driver.

The aforementioned horizontal line image is to help recognize the hitch ball position. Displaying the horizontal line image on the position of the counterpart coupling member with illustration data is further advantageous to the driver. For example as shown in FIG. 14A, in case the position of the counterpart coupling member 5 has coincided with the hitch ball position of the hitch 3 in an image shot by the rearview camera 2, they are actually dislocated from each other, which will tail to bring the hitch 3 head into the coupling member.

In other words, as shown in FIG., 14B, when the position of the counterpart coupling member 5 has coincided with the hitch ball position of the hitch 3 in the real space, there is a dislocation between both images in the image shot by the rearview camera 2 (between the projection point c of hitch ball and the projection point d of the counterpart coupling member). This is because these positions are in different levels from the ground.

Figure 14B:
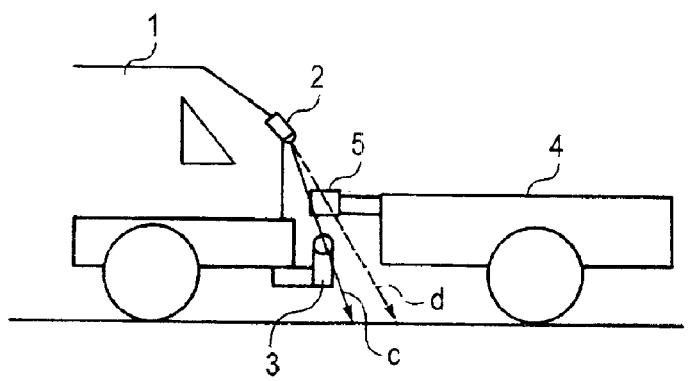
Figure 15:
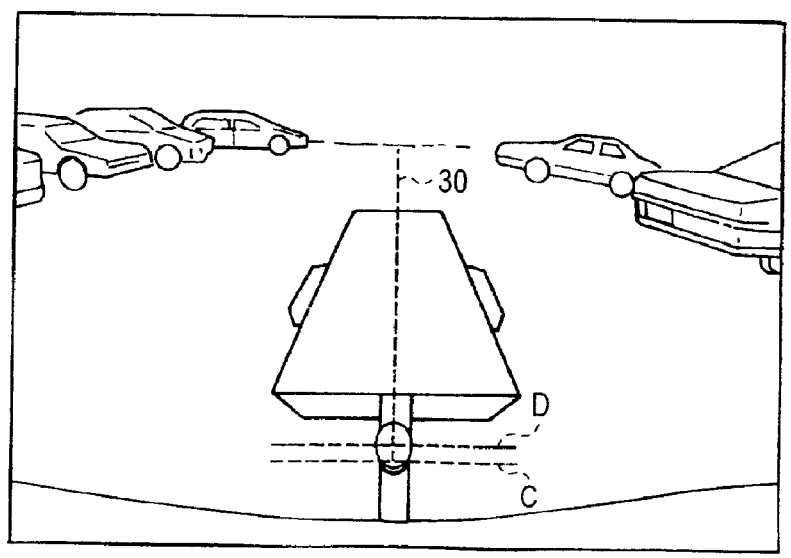
FIG. 15 shows an example of screen display according to an embodiment of the invention.

As shown in FIG. 15, displaying the horizontal line image C indicating the position of the ground projection point c of the hitch ball shown in FIG. 14B and the horizontal line image D indicating the position of the ground projection point d of the counterpart coupling member assists the driver. In the example shown in FIG. 15, the horizontal line images C, D are respectively displayed at the position of the ground projection points c, d. The driver knows that the position of the hitch 3 actually coincide with the position of the counterpart coupling member 5 when the distance between the horizontal line images C and D has reached a predetermined distance on the screen.

However, through fine adjustment on the operation section in FIG. 5 so that the horizontal line images C, D are displayed at the position of the head of actual hitch 3 and position of the counterpart coupling member 5, not ground projection points c, d, the head of the hitch 3 actually coincides with the counterpart coupling member 5 when the horizontal line image C and horizontal line image D coincides with each other on the screen. This allows intuitive driving.

The horizontal line images indicating the aforementioned position of the hitch and the position of the counterpart coupling member maybe displayed in different colors or different forms such as in solid/dot lines to allow the driver to easily discriminate between them. This allows the driver to discriminate between them even when the hitch 3 is quite close to the counterpart coupling member 5 thus assuring accurate coupling work. This method, same as the procedure in FIG. 6 for changing the display format of auxiliary lines as the vehicle approaches the trailer, changes the display format of horizontal line images as the distance between the vehicle and the trailer becomes shorter. This intuitively alerts the driver.

As described in FIGS. 12A and B, in case the distance from the rear end of the vehicle to the hitch is different, size of the hitch image and position of the hitch image in the screen are different. A method for accurately calculating the display position of a horizontal line image due to difference in the hitch position will be described.

As shown in FIG. 16, an adapter 40 as reference check means is provided. The adapter 40 includes a cup-shaped member 41 that can be put on the hitch 3 and a protrusion 42 of a predetermined length 'L' projecting above the cup-shaped member 41. On the left of FIG. 16 are shown the state where the adapter 40 is put on the hitch 3a attached near the rear end of the vehicle 1 and the state where the adapter 40 is put on the hitch 3b attached far from the rear end of the vehicle 1.

An image projected onto a projection face between the upper end 43 and lower end 44 of the shooting angle (field of view) of the rearview camera 2 attached at the rear of the vehicle 1 is considered as a shot image. A screen 46 of the shot image is schematically shown on the right of FIG. 16. On the screen 46, the position of an image 3B of the hitch 3b and the adapter 40 put thereon has a height different from that of the position of an image 3A of the hitch 3a and the adapter 40 put thereon. On the screen 46, in contrast to the distance H1 from the lower end of the screen 46 (lower end 43 of field of view) to the end of the image 3A (end of protrusion 42) and the image length L2 of the protrusion 42, the distance is H2 and length L2 in the image 3B.

When the driver changes the hitch used from hitch 3a to hitch 3b, the driver first puts the adapter 40 on the hitch 3a then captures the aforementioned data (distance H1, length L1) into the system controller 10. Next the driver replaces the hitch 3a with hitch 3b and puts the adapter 40 on the hitch 3b then captures the aforementioned data (distance H2, length L1) into the system controller 10.

The calculating section provided inside the system controller 10 calculates the position of the horizontal line image assumed when the hitch 3b is used instead of the hitch 3b, from the difference between the actual length "L2" of the protrusion 42 and length L1, L2 measured on the screen 46 as well as the screen display position H1, H2. The display adjusting section provided inside the system controller 10 automatically displays the illustration data of a horizontal line image at the position calculated by the calculating section. This relieves the driver of the workload of manually adjusting the display position of a horizontal line image only by putting the adapter 40 on the hitch and letting corresponding data be loaded into the system controller 10 in replacing hitches to adapt to the trailer used.

While the adapter 40 is put on the hitch to calculate the modified hitch position in this embodiment, in case the counterpart trailer is changed, the reference adapter is preferably attached to the counterpart coupling member 5 to acquire position data and automatically calculates the display position of a horizontal line image indicating the position of the counterpart coupling member.

While the adapter 40 of the embodiment has a protrusion 42 of a length "L" projecting upward in vertical direction, another protrusion of a predetermined length projecting in horizontal direction may be provided and position data in the direction of depth on the screen may be acquired to allow more accurate position calculation.

According to the invention, A panoramic image shot by a rearview camera assures easy recognition of the straight rear direction. This allows a driver alone to easily back a vehicle in an attempt to couple a hitch on the vehicle with a trailer.

What is claimed is:

1. An image display method for a rearview camera for displaying an image shot by a rearview camera mounted on a vehicle on a screen that is viewed from a driver's seat, comprising the step of:
    displaying an auxiliary line image indicating the straight rear direction of the vehicle superimposed on the image shot by the camera on the screen,
    wherein said auxiliary line image extends from the position of a hitch attached at the rear of the vehicle.

2. The image display method for a rearview camera according to claim 1, wherein said auxiliary line image has a distance marker.

3. The image display method for a rearview camera according to claim 1, wherein a portion where said auxiliary line image overlaps a rearward obstacle is hidden.

4. The image display method for a rearview camera according to claim 1, wherein said auxiliary line image is discriminated from other images.

5. The image display method for a rearview camera according to claim 4, wherein said auxiliary line image is displayed by blinking.

6. The image display method for a rearview camera according to of claim 1, further comprising the step of:
    converting the image shot by said rearview camera to an image from an overhead viewpoint,
    wherein the resulting image is displayed in said screen when the distance between the vehicle and the rearward obstacle has become within a predetermined range.

7. The image display method for a rearview camera according to claim 6, wherein said auxiliary line image is superimposed on said image from said overhead viewpoint.

8. The image display method for a rearview camera according to claim 6, further comprising the step of displaying a zoomed image from said overhead viewpoint.

9. The image display method for a rearview camera according to claim 6, further comprising the step of:
    superimposing a horizontal line image crossing said auxiliary line image at a right angle and passing through the center of said hitch on said image from the overhead viewpoint.

10. The image display method for a rearview camera according to claim 1, further comprising the step of:
    displaying the auxiliary line image to blink at predetermined intervals when said image of the hitch and an image of the coupling counterpart have approached each other within a predetermined distance.

11. The image display method for a rearview camera according to claim 1, further comprising the step of:
    displaying a horizontal line image crossing said auxiliary line image at a right angle and passing through the center of said hitch by illustration data.

12. The image display method for a rearview camera according to claim 11, wherein the vertical position of said horizontal line image in the screen is able to be adjusted.

13. The image display method for a rearview camera according to claim 1, further comprising the step of:
    displaying a horizontal line image of the coupling counterpart crossing said auxiliary line image at a right angle and passing through the predetermined section of said coupling counterpart of the hitch by using illustration data so that said horizontal line image of said coupling counterpart and said auxiliary line image can be discriminated from each other.

14. An image display apparatus for a rearview camera for displaying an image shot by a rearview camera mounted on a vehicle on a screen that is viewed from a driver's seat, comprising:
    a display unit for superimposing an auxiliary line image indicating the straight rear direction of the vehicle on the image shot by the camera on the screen,
    wherein said auxiliary line image extends from the position of a hitch attached at the rear of the vehicle.

15. The image display apparatus for a rearview camera according to claim 14, wherein said auxiliary line image has a distance marker.

16. The image display apparatus for a rearview camera according to claim 14, wherein the portion where said auxiliary line image overlaps a rearward obstacle is hidden.

17. The image display apparatus for a rearview camera according to claim 14, wherein said auxiliary line image is discriminated from other images.

18. The image display apparatus for a rearview camera according to claim 17, wherein said auxiliary line image is blinking.

19. The image display apparatus for a rearview camera according to claim 14, further comprising:
    a converting unit for converting an image shot by said rearview camera to an image from an overhead viewpoint,
    wherein the resulting image is displayed in said screen when the distance between the vehicle and the rearward obstacle has become within a predetermined range.

20. The image display apparatus for a rearview camera according to claim 19, wherein said auxiliary line image is superimposed on said image from said overhead viewpoint.

21. The image display apparatus for a rearview camera according to claim 19, wherein the image from said overhead viewpoint is displayed to be zoomed.

22. The image display apparatus for a rearview camera according to claim 19, wherein a horizontal line image crossing said auxiliary line image at a right angle and passing through the center of said hitch is superimposed on said image from the overhead viewpoint.

23. The image display apparatus for a rearview camera according to claim 14, the auxiliary line image is displayed to blink at predetermined intervals when said image of the hitch and an image of the coupling counterpart have approached each other within a predetermined distance.

24. The image display apparatus for a rearview camera according to claim 14, wherein a horizontal line image crossing said auxiliary line image at a right angle and passing through the center of said hitch is displayed by using illustration data.

25. The image display apparatus for a rearview camera according to claim 24, further comprising:
an operating unit for adjusting the vertical position of said horizontal line image in the screen.

26. The image display apparatus for a rearview camera according to claim 14, wherein a horizontal line image of the coupling counterpart crossing said auxiliary line image at a right angle and passing through the predetermined section of said coupling counterpart of the hitch is displayed by using illustration data so that said horizontal line image of said coupling counterpart and said auxiliary line image can be discriminated from each other.

27. The image display apparatus for a rearview camera according to claim 14, further comprising:
a calculating unit for calculating the position of said hitch based on the difference between the length of a reference axis in an image shot by a shooting unit and a predetermined length of a reference check unit.

28. The image display apparatus for a rearview camera according to claim 27, further comprising:
an adjusting unit for adjusting the position of a horizontal line image based on the calculation result calculated by a calculating unit when a horizontal line image crossing said auxiliary line image at a right angle and passing through the center of said hitch is displayed by using illustration data.

* * * * *